June 1, 1948.　　　　C. H. AUGER　　　　2,442,579
GAS TURBINE
Filed June 20, 1944

Inventor:
Claude H. Auger,
by Harry E. Dunham
His Attorney.

Patented June 1, 1948

2,442,579

UNITED STATES PATENT OFFICE 2,442,579

GAS TURBINE

Claude H. Auger, Saugus, Mass., assignor to General Electric Company, a corporation of New York Application June 20, 1944, Serial No. 541,244

7 Claims. (Cl. 60—41)

The present invention relates to gas turbines and is of particular interest in connection with turbo-superchargers having a turbine with a single bucket wheel secured to an overhung shaft and a nozzle box located on the inlet side of the turbine and concentrically surrounding the bearing for the turbine shaft. These turbines include means for cooling the bearing by circulating cooling air through the annular space between the nozzle box and the bearing housing. Sealing means are usually provided between the nozzle box and the bearing cap or housing to prevent the hot gases leaking from the nozzle into the region surrounding the bearing housing and mixing with the air which would cause further burning of the unburned portion of the gases in the space between the bucket wheel and bearing cap.

The object of my invention is to provide an improved sealing arrangement between the nozzle box and the bearing housing in gas turbines of the type above specified.

The present invention is an improvement on the arrangement covered by Patent No. 2,414,841 of Dale D. Streid (a division of application Serial No. 431,924, filed February 23, 1942, now Patent No. 2,414,840), assigned to the same assignee as the present application.

For a consideration of what I believe to be novel and my invention, attention is directed to the following description and the claims appended thereto in connection with the accompanying drawing.

Figure 1:
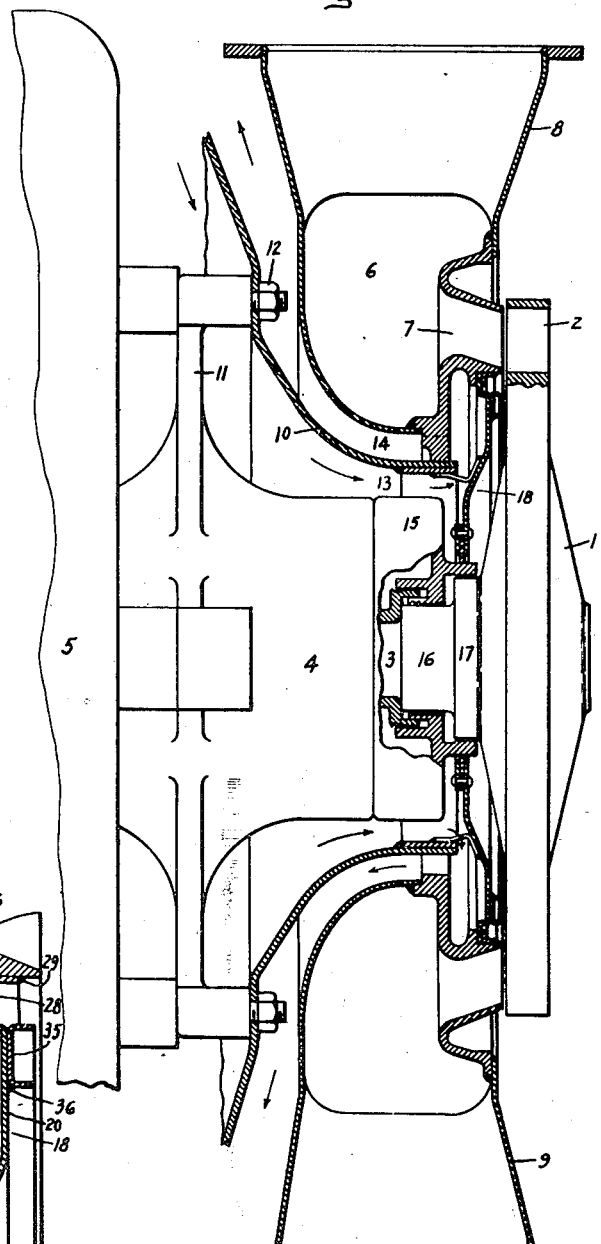
Figure 2:
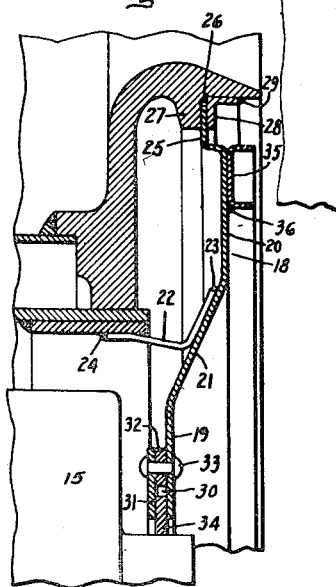

In the drawing Fig. 1 illustrates a turbo-supercharger embodying my invention, and Fig. 2 is an enlarged view of a part of Fig. 1.

The arrangement comprises a gas turbine having a bucket wheel 1 with a ring of circumferentially spaced buckets 2 attached to its rim. The wheel is secured to an overhung portion of a shaft 3 rotatably supported in a bearing housing 4. The turbine wheel is arranged to drive a centrifugal type compressor 5. Gases such as exhaust gases from an internal combustion engine are conducted to the bucket wheel by means of a nozzle box 6 which has a row of circumferentially spaced partitions 7 forming nozzles between them for conducting gases to the wheel. The nozzle box 6 has an inlet conduit 8 for receiving operating gases and a waste conduit 9 through which some of the gases may be discharged directly into the atmosphere. The nozzle box is supported on the inner end of a baffle 10 which has intermediate portions secured to arms 11 on the bearing housing 4 by means of bolts or studs and nuts 12.

The baffle 10 together with the adjacent walls of the bearing housing and the nozzle box define two annular channels 13, 14 through which cooling air is circulated in the direction of the arrows, to cool the bearing and to reduce heat transfer from the nozzle box towards the bearing. Such cooling air may be forced into the channel 13 by means of a ram air intake, not shown, facing the slipstream of an aircraft. The air flows from the channel 13 around the inner edge of the baffle 10 into the channel 14 and is discharged from the latter into the aircraft slipstream.

In order to prevent cooling air from entering the annular clearance space between the bucket wheel and sealing plate, means are provided for sealing the nozzle diaphragm to the bearing cap 15. The bearing cap 15 forms a labyrinth seal with a cylindrical portion 16 of the shaft and a hub portion 17 of the bucket wheel disk.

The sealing means between the nozzle box and the bearing cap 15 comprises a sealing plate 18 which has inner and outer disk portions 19 and 20 which are axially spaced and integrally united by an intermediate conical disk portion 21. The intermediate portion 21 is braced against lateral deflection by a plurality of circumferentially spaced brackets 22 having ends fused to the disk portion 21 and to the aforementioned baffle 10 by welds 23 and 24 respectively. The disk has an outer offset edge portion or rim 25 loosely projecting into a sealing groove 26, which groove is formed between a flange 27 on the nozzle diaphragm and a ring 28 secured to the nozzle box wall by a weld 29 (Fig. 2). A sealing groove 30 is formed near the inner edge portion of the disk or plate by means of a ring 31 and a spacer 32 secured to the inner disk portion by rivets 33. These rivets may of course be replaced by spot welds, or other suitable fastening means. A sealing ring 34 has a light frictional engagement in the groove 30 and a snug but sliding fit on a cylindrical portion of the bearing cap. An annular channel ring 35, U-shaped in section, is secured to the outer disk portion 20 of the plate 18 by means of a weld 36, or any other suitable fastening means, in proximity to the rim of the bucket wheel, forming a close clearance therewith to reduce radial leakage of hot gases from the clearance space between the nozzles and the buckets into the annular space formed between sealing plate 18 and the bucket wheel disk.

Thus, the sealing means according to my invention includes a plate which is supported against movement in an axial direction, while the inner and outer portions of the plate have a snug frictional sealing engagement so arranged to permit free differential thermal expansion of the various portions of the plate radially with respect to each other and to the nozzle diaphragm and the bearing cap respectively. This permits relative expansion between the nozzle box and the bearing cap without transmitting stresses between them. The nozzle box is free to move radially relative to the outer offset edge portion 25, and the inner edge portion 18 of the plate 18 is free to move relative to the bearing cap. The plate 18 is made of relatively thin sheet metal, rendering it somewhat flexible and permitting some axial movement between the nozzle box and the plate without setting up excessive stresses in the latter. The shape of the plate, including the "dished" intermediate portion 21, is specifically intended to permit differential thermal expansion of the hot outer portion 20 radially outward relative to the comparatively cool inner portion 19, without causing irregular buckling or warping with consequent failure of the plate or rubbing of the gas sealing ring 35 on the turbine wheel.

What I claim as new and desire to secure by Letters Patent of the United States, is:

1. Gas turbine comprising a bucket wheel with a shaft, bearing means supporting the wheel and having a housing with an end cap, a nozzle box located on one side of the wheel and concentrically spaced from the bearing means, an annular baffle plate spaced between the bearing housing and the nozzle box wall and forming cooling channels therewith for receiving cooling air, and sealing means between the nozzle box and the end cap to prevent the flow of cooling air into the clearance space between the bucket wheel and sealing plate, said sealing means comprising an annular disk, bracket means supporting the intermediate portion of the disk on the baffle, means loosely sealing the inner edge portion of the disk to the end cap and means loosely sealing the outer edge portion of the disk to the nozzle box.

2. In a gas turbine the combination of a bucket wheel with a shaft, bearing means supporting the shaft and having an end cap, a nozzle box located on one side of the wheel and concentrically spaced from the bearing means, a baffle having a portion located between the bearing and the nozzle box for supporting the latter and defining therewith cooling channels for receiving cooling air, and means for sealing a wall portion of the box near the nozzles to the end cap to prevent cooling air from leaking into the clearance space between the bucket wheel and nozzle box, said sealing means comprising an annular plate, a sealing groove formed on the nozzle box wall having sealing engagement with the rim of the plate, means forming another sealing groove near the inner edge of the plate and a ring having loose sealing fit with the end cap and slidingly projecting into the other sealing groove.

3. Gas turbine comprising a bearing, a bucket wheel supported in the bearing, a nozzle box having a ring of nozzles for conducting gases to the bucket wheel, said ring of nozzles having an inner cylindrical wall concentric with and radially spaced from the bearing, and means loosely sealing said inner wall to the bearing comprising an annular sealing plate having an intermediate portion and inner and outer radially and axially spaced annular portions, means supporting the intermediate portion, the inner and outer annular portions being free to expand differentially in a radial direction, and means loosely sealing the edges of the inner and outer disk portions to the bearing and said inner wall respectively.

4. In a gas turbine having a bucket wheel on a shaft supported in a bearing housing, an annular baffle concentric with the bearing housing and radially spaced therefrom, and a nozzle box surrounding and supported by said baffle in radially spaced relation thereto, the combination of a sealing plate assembly comprising an annular disk having an outer portion with an outer circumferential edge in radially slidable sealing engagement with a substantially radially extending annular groove in the nozzle box, an intermediate axially dished portion, bracket means associated with said dished portion for supporting the sealing plate in spaced relation from the edge of the annular nozzle-box support baffle, an inner portion having a central opening surrounding and larger than said bearing housing, and means forming a sliding seal between the outer surface of said bearing housing and the edge of said central opening.

5. In a high temperature gas turbine, the combination of a bucket wheel with an axially extending hub portion and shaft, a bearing housing supporting the shaft and having an end cap defining a labyrinth seal with the hub portion of the bucket wheel, an annular nozzle box support baffle surrounding and radially spaced from the bearing housing and defining therewith a cooling air inlet passage, an annular nozzle box surrounding and supported on and radially spaced from said baffle so as to define therewith a cooling air exit passage, and a sealing plate assembly axially spaced from the end of said baffle so as to define a cooling air passage therewith communicating between said cooling air inlet and exit passages, said sealing plate assembly comprising an annular plate having radially spaced annular portions connected by an axially dished intermediate portion, the outer circumferential edge of the sealing plate being received in an annular radially extending groove in the nozzle box in radially slidable sealing engagement therewith, bracket means associated with said intermediate dished portion for holding the sealing plate in axially spaced relation with said baffle, and sealing means arranged between the inner circumferential portion of the sealing plate and the outer circumference of said bearing housing end cap, said last-named sealing means comprising a member cooperating with the inner circumferential portion of the sealing plate to define an annular radially extending groove and a floating annular washer having an outer circumferential portion in radially slidable sealing relation with said last-mentioned groove and an inner circumferential portion in axially slidable sealing engagement with the outer surface of said bearing housing end cap.

6. In a high temperature gas turbine, the combination of a bucket wheel with an axially extending hub portion and shaft, a bearing housing supporting the shaft and having an end cap defining a labyrinth seal with the hub portion of the bucket wheel, an annular nozzle box support baffle surrounding and radially spaced from the bearing housing and defining therewith a cooling air inlet passage, an annular nozzle box surrounding and supported on and radially spaced from said baffle so as to define therewith a cooling air exit passage, and a sealing plate assembly axially spaced from the end of said baffle so as to define a cooling air passage therewith communicating between said cooling air inlet and exit passages, said sealing plate assembly comprising an annular plate having radially spaced annular portions connected by an axially dished intermediate portion, the outer circumferential edge of the sealing plate being received in an annular radially extending groove in the nozzle box in radially slidable sealing engagement therewith, bracket means associated with said intermediate dished portion for holding the sealing plate in axially spaced relation with said baffle, and sealing means arranged between the inner circumferential portion of the sealing plate and the outer circumference of said bearing housing end cap.

7. In a gas turbine having a bucket wheel with an axially extending hub portion and shaft, a bearing housing supporting said shaft and having a cylindrical labyrinth seal member extending axially towards the bucket wheel and in sealing engagement with the outer circumference of said hub portion, an annular nozzle box concentric with and radially spaced from the bearing housing, and a sealing plate assembly arranged between the outer circumferential surface of said labyrinth seal member and an inner circumferential surface of said nozzle box, said sealing plate comprising an annular disk having an outer circumferential portion with an outer edge in radially slidable sealing engagement with an annular groove in said inner circumferential surface of the nozzle box, an inner circumferential portion axially spaced from said outer portion and having an inner edge surrounding and radially spaced from said labyrinth seal member, slidable sealing means for the space between said labyrinth seal member and said inner edge of the sealing plate, the sealing plate having an annular portion intermediate and connecting said inner and outer portions in such a manner as to permit differential thermal expansion in a radial direction therebetween.

CLAUDE H. AUGER.

REFERENCES CITED

The following references are of record in the file of this patent:

UNITED STATES PATENTS

| Number | Name | Date |
|---|---|---|
| 2,391,786 | Kenney | Dec. 25, 1945 |

FOREIGN PATENTS

| Number | Country | Date |
|---|---|---|
| 452,412 | Great Britain | Aug. 24, 1936 |